(12) United States Patent
Lee et al.

(10) Patent No.: US 8,633,132 B2
(45) Date of Patent: Jan. 21, 2014

(54) HYDROCARBON REFORMING CATALYST, METHOD OF PREPARING THE SAME AND FUEL CELL INCLUDING THE HYDROCARBON REFORMING CATALYST

(75) Inventors: Hyun-chul Lee, Hwaseong-si (KR); Doo-hwan Lee, Suwon-si (KR); Eun-duck Park, Seoul (KR); Kang-hee Lee, Suwon-si (KR); Yun-ha Kim, Jeju-si (KR); Jae-hyun Park, Daegu (KR)

(73) Assignees: Samsung Electronics Co., Ltd., Suwon-si, Gyeonggi-do (KR); Samsung SDI Co., Ltd., Suwon-si, Gyeonggi-do (KR)

( * ) Notice: Subject to any disclaimer, the term of this patent is extended or adjusted under 35 U.S.C. 154(b) by 351 days.

(21) Appl. No.: 12/641,599

(22) Filed: Dec. 18, 2009

(65) Prior Publication Data

US 2010/0167919 A1    Jul. 1, 2010

(30) Foreign Application Priority Data

Dec. 30, 2008   (KR) ........................ 10-2008-0137166

(51) Int. Cl.
*H01M 4/88* (2006.01)
*B01J 37/00* (2006.01)
*B01J 23/00* (2006.01)
*H01M 4/02* (2006.01)

(52) U.S. Cl.
USPC ........... 502/315; 502/101; 502/104; 502/300; 429/527

(58) Field of Classification Search
None
See application file for complete search history.

(56) References Cited

U.S. PATENT DOCUMENTS

| 4,207,211 A | 6/1980 | Russ et al. |
| 2003/0032554 A1 | 2/2003 | Park et al. |
| 2003/0165424 A1* | 9/2003 | Ramani et al. ............... 423/651 |
| 2004/0067848 A1 | 4/2004 | Wakatsuki et al. |
| 2004/0142815 A1 | 7/2004 | Ramani et al. |
| 2004/0142817 A1 | 7/2004 | Park et al. |
| 2007/0082236 A1 | 4/2007 | Lee et al. |

FOREIGN PATENT DOCUMENTS

| GB | 1719033 | 1/1970 |
| GB | 1319191 | 6/1973 |
| JP | 02-207843 | 8/1990 |
| JP | 2006-110399 | 4/2006 |
| KR | 10-2002-0088213 A | 11/2002 |
| WO | WO 03/072492 A1 | 9/2003 |

OTHER PUBLICATIONS

European Extended Search in EP 09180732.1-2104/2208592, dated Oct. 21, 2010 (Lee, et al.), European Office Action from prosecution of corresponding European application.

* cited by examiner

*Primary Examiner* — Milton I Cano
*Assistant Examiner* — Sarah A Slifka
(74) *Attorney, Agent, or Firm* — Lee & Morse, P.C.

(57) ABSTRACT

A hydrocarbon reforming catalyst, a method of preparing the hydrocarbon reforming catalyst, and a fuel cell including the hydrocarbon reforming catalyst. The hydrocarbon reforming catalyst includes an oxide support as well as a nickel active catalyst layer, a metal oxide, an alkali metal supported by the oxide support.

18 Claims, 7 Drawing Sheets

HYDROCARBON REFORMING CATALYST, METHOD OF PREPARING THE SAME AND FUEL CELL INCLUDING THE HYDROCARBON REFORMING CATALYST

CROSS-REFERENCE TO RELATED APPLICATIONS

This application claims the benefit of Korean Patent Application No. 10-2008-0137166, filed on Dec. 30, 2008, in the Korean Intellectual Property Office, the disclosure of which is incorporated herein in its entirety by reference.

BACKGROUND

1. Field

One or more embodiments relate to a hydrocarbon reforming catalyst, a method of preparing the same, and a fuel cell including the hydrocarbon reforming catalyst. More particularly, one or more embodiments relate to a hydrocarbon reforming catalyst having high coking resistance, a method of preparing the same, and a fuel cell including the hydrocarbon reforming catalyst.

2. Description of the Related Art

New energy sources are currently receiving attention due to environmental problems. Fuel cells are an example of these new energy sources. In fuel cells, hydrogen is electro-chemically reacted with oxygen, thereby converting chemical energy into electric energy. Fuel cells have high energy efficiency, and are being actively studied for practical use in personal use, industrial applications and automobiles.

Fuel cells use a hydrogen supplier, such as methanol, liquefied natural gas that includes methane as a major component, city gas that includes the liquefied natural gas as a major component, synthesized liquid fuel that uses natural gas as a source, or a petroleum hydrocarbon such as naphtha or kerosene, in order to produce hydrogen.

When a petroleum hydrocarbon is used to produce hydrogen, in general, a steam reforming reaction of the petroleum hydrocarbon is performed in the presence of a catalyst. In this case, in general, a support carrying ruthenium as an active component can be used as the catalyst. In addition, since co-catalytic effects of a cerium oxide or zirconium oxide catalyst with respect to a ruthenium catalyst have been discovered, research into catalysts based on ruthenium and cerium oxide or zirconium oxide is being performed. Furthermore, research into catalysts including as an active component, in addition to ruthenium, platinum, rhodium, palladium, iridium, or nickel is being performed.

SUMMARY

One or more embodiments include a new hydrocarbon reforming catalyst.

One or more embodiments include a method of preparing a hydrocarbon reforming catalyst.

One or more embodiments include a fuel cell including the hydrocarbon reforming catalyst.

Additional aspects will be set forth in part in the description which follows and, in part, will be apparent from the description, or may be learned by practice of the invention.

One or more embodiments may include a hydrocarbon reforming catalyst including an oxide support; and a nickel, a metal oxide, and an alkali metal or alkali earth metal supported by the oxide support.

According to a particular, non-limiting aspect, the oxide support includes at least one oxide selected from the group consisting of $Al_2O_3$, $SiO_2$, $ZrO_2$, $TiO_2$ and YSZ (yttria-stabilized zirconia).

According to a particular, non-limiting aspect, the metal oxide includes at least one oxide selected from the group consisting of manganese oxide, tin oxide, cerium oxide, rhenium oxide, molybdenum oxide and tungsten oxide.

According to a particular, non-limiting aspect, the alkali metal or alkali earth metal includes at least one metal selected from the group consisting of lithium, sodium, potassium, magnesium, and calcium.

According to a particular, non-limiting aspect, the metal oxide is distributed on a layer including the nickel.

According to a particular, non-limiting aspect, the metal oxide is distributed in a layer including the nickel.

According to a particular, non-limiting aspect, the amount of nickel is in a range of about 1.0 to about 40 parts by weight based on 100 parts by weight of the hydrocarbon reforming catalyst.

According to a particular, non-limiting aspect, the amount of metal in the metal oxide is in a range of about 0.5 to about 20 parts by weight based on 1 part by weight of nickel.

According to a particular, non-limiting aspect, the amount of alkali metal or alkali earth metal is in a range of about 0.1 to about 20 parts by weight based on 100 parts by weight of the hydrocarbon reforming catalyst.

One or more embodiments may include a method of manufacturing a hydrocarbon reforming catalyst, the method including: loading nickel onto an oxide support, thereby obtaining a first resultant structure; loading a metal oxide onto the first resultant structure; and loading alkali metal or alkali earth metal, wherein the alkali metal or alkali earth metal is loaded at at least one time selected from before the nickel is loaded, after the nickel is loaded and before the metal oxide is loaded, and after the metal oxide is loaded.

One or more embodiments may include a method of manufacturing a hydrocarbon reforming catalyst, the method including: loading a metal oxide onto an oxide support, thereby obtaining a first resultant structure; loading nickel onto the first resultant structure; and loading an alkali metal or alkali earth metal, wherein the alkali metal or alkali earth metal is loaded at at least one time selected from before the metal oxide is loaded, after the metal oxide is loaded and before the nickel is loaded, and after the nickel is loaded.

One or more embodiments may include a method of manufacturing a hydrocarbon reforming catalyst, the method including: simultaneously loading a metal oxide and nickel onto an oxide support; and loading a alkali metal or alkali earth metal, wherein the alkali metal or alkali earth metal is loaded before or after the metal oxide and nickel are simultaneously loaded.

One or more embodiments may include a method of manufacturing a hydrocarbon reforming catalyst, the method including simultaneously loading nickel, a metal oxide, and an alkali metal or alkali earth metal onto an oxide support.

According to a particular, non-limiting aspect, the loading of the nickel, the loading of the metal oxide, and the loading of the alkali metal or alkali earth metal are each performed independently by deposition precipitation, co-precipitation, wet impregnation, sputtering, gas-phase grafting, liquid-phase grafting or incipient-wetness impregnation.

According to a particular, non-limiting aspect, each of the loading of the nickel, the loading of the metal oxide, and the loading of the alkali metal or alkali earth metal further includes performing a heat-treatment process at a temperature in a range of about 500 to about 750° C. for about 2 to about 5 hours.

According to a particular, non-limiting aspect, a catalyst produced using the method described above may be reduced at a temperature in a range of about 600 to about 950° C. in a hydrogen atmosphere for about 1 to about 2 hours, and then used in a reforming reaction.

One or more embodiments may include a fuel cell including the hydrocarbon reforming catalyst described above.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION

Reference will now be made in detail to the present embodiments of the present invention, examples of which are illustrated in the accompanying drawings, wherein like reference numerals refer to the like elements throughout.

Hereinafter, a hydrocarbon reforming catalyst according to an embodiment will be described in detail.

The hydrocarbon reforming catalyst promotes a steam reforming reaction (SR reaction) shown in Reaction Scheme 1 below to generate hydrogen that is used as a fuel in a fuel cell system. According to the SR reaction, hydrocarbon reacts with water at a high temperature:

$$C_nH_m + nH_2O \rightarrow nCO + (n+m/2)H_2 \quad \text{<Reaction Scheme 1>}$$

In general, CO gas generated in Reaction Scheme 1 reacts with water at moderate and low temperatures in a range of about 200 to about 400° C. in a water gas shift reaction shown in Reaction Scheme 2, thereby forming $CO_2$ and $H_2$. As a result, the amount of CO gas in a reformed gas can be minimized.

$$CO + H_2O \rightarrow CO_2 + H_2 \quad \text{<Reaction Scheme 2>}$$

The SR reaction may be performed at a temperature in a range of about 600 to about 900° C. by using a catalytic-chemical method. In this case, properties desired of the hydrocarbon reforming catalyst include high reforming reactivity with respect to hydrocarbon (that is, catalytic activity), coking resistance (that is, carbon deposition suppression) and sustainable performance stability at high temperatures (that is, long lifetime).

The hydrocarbon reforming catalyst according to the current embodiment includes nickel as an active catalyst, a metal oxide as a first co-catalyst, an alkali metal or alkali earth metal as a second co-catalyst, and an oxide support, wherein the three components are supported by the oxide support. The hydrocarbon reforming catalyst has high catalytic activity, and also, due to inclusion of the metal oxide and the alkali metal or alkali earth metal, has high coking resistance and sustainable performance stability.

The hydrocarbon reforming catalyst uses the oxide support to support the active catalyst and the first and second co-catalysts. The oxide support may be a support that is conventionally used in a reforming catalyst, such as, for example, an oxide support that has a porous structure having a large surface area. As non-limiting examples, the oxide support may include at least one oxide selected from the group consisting of $Al_2O_3$, $SiO_2$, $ZrO_2$, $TiO_2$ and YSZ (yttria-stabilized zirconia).

The hydrocarbon reforming catalyst may include a nickel active catalyst layer including nickel as an active component. Nickel has excellent catalytic activity and is inexpensive compared to ruthenium, platinum, rhodium, palladium, and iridium, which are conventionally used as an active component of a reforming catalyst. Thus, costs of manufacturing the hydrocarbon reforming catalyst can be reduced. The amount of nickel may be in a range of about 1.0 to about 40 parts by weight based on 100 parts by weight of the hydrocarbon reforming catalyst. The nickel may form a continuous or discontinuous layer on the oxide support.

The hydrocarbon reforming catalyst may include as the first co-catalyst at least one metal oxide selected from the group consisting of manganese oxide, tin oxide, cerium oxide, rhenium oxide, molybdenum oxide and tungsten oxide. For example, the metal oxide may be manganese oxide. The amount of metal oxide in the hydrocarbon reforming catalyst may be such that the amount of metal of the metal oxide is in a range of about 0.5 to about 20 parts by weight based on 1 part by weight of nickel in the hydrocarbon reforming catalyst. The metal oxide may be distributed on a surface of and/or in the nickel active catalyst layer. For example, the metal oxide may be distributed on the nickel active catalyst layer.

The hydrocarbon reforming catalyst also includes as the second co-catalyst, an alkali metal such as lithium, sodium, or potassium; or an alkali earth metal such as magnesium or calcium. For example, the second co-catalyst may be potassium, sodium, or magnesium. As a specific, non-limiting example, the second co-catalyst may be potassium. The amount of the second co-catalyst may be in a range of about 0.1 to about 20 parts by weight based on 100 parts by weight of the hydrocarbon reforming catalyst.

In a fuel cell system, the use of hydrocarbons, such as unsaturated hydrocarbons including a large number of carbons, as a source of hydrogen may lead to carbon deposition during the SR reaction and thus, the performance of a catalyst can be degraded. When excessive carbon deposition occurs, the formed carbon deposit may accumulate in a reactor such that pressure in the reactor is increased and the SR reaction may stop. However, for the hydrocarbon reforming catalyst according to the current embodiment, such carbon deposition can be prevented because the hydrocarbon reforming catalyst includes a metal oxide as the first co-catalyst, and an alkali metal or alkali earth metal as the second co-catalyst.

Hereinafter, the structure of the hydrocarbon reforming catalyst will be described in detail with reference to FIG. 1.

Figure 1:
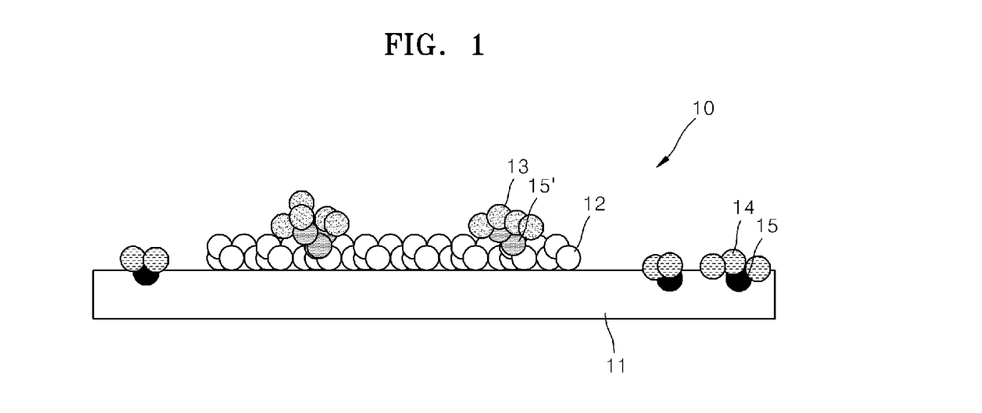
FIG. 1 is a schematic view of a hydrocarbon reforming catalyst according to an embodiment.

FIG. 1 is a schematic view of a hydrocarbon reforming catalyst 10 according to an embodiment. Referring to FIG. 1, the hydrocarbon reforming catalyst 10 according to the present embodiment includes an oxide support 11, a nickel active catalyst layer 12, a metal oxide 13 as a first co-catalyst, and an alkali metal or alkali earth metal 14 as a second co-catalyst. The nickel active catalyst layer 12 is supported by the oxide support 11, and the metal oxide 13 is distributed on the nickel active catalyst layer 12. The alkali metal or alkali earth metal 14 is distributed on the oxide support 11.

Without being bound to any particular theory, a possible mechanism by which the hydrocarbon reforming catalyst avoids coking during a reforming of a hydrocarbon is as follows: If coking sites 15 and 15' in which carbon deposition occurs during a SR reaction are formed in the hydrocarbon reforming catalyst 10, the metal oxide 13 can block the coking site 15' on the nickel active catalyst layer 12 and the alkali metal or alkali earth metal 14 can block the coking site 15 on the oxide support 11, thereby preventing a decrease in catalytic activity. However, the current embodiment is not limited to this mechanism.

For a hydrocarbon reforming catalyst according to another embodiment, a nickel active catalyst and metal oxide as a first co-catalyst are structurally hybridized and the hybridization product is supported by an oxide support. The metal oxide may exist in and/or on a nickel active catalyst layer. Without being bound to any particular theory, according to the following mechanism, formation of a coking site in the nickel activity catalyst layer is suppressed due to hybridization of the metal oxide and the nickel active catalyst. In addition, an alkali metal or alkali earth metal as a second co-catalyst covers a coking site on the oxide support. Accordingly, a decrease in catalytic activity because of coking can be prevented.

Hereinafter, methods of preparing a hydrocarbon reforming catalyst according to various embodiments will be described in detail with reference to FIGS. 2 through 5, which are diagrams illustrating the methods.

Figure 2:
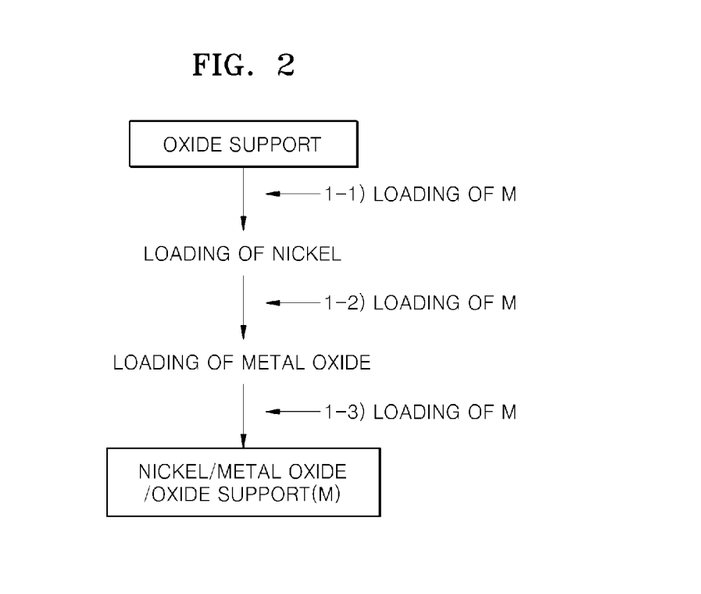
FIG. 2 is a diagram illustrating a method of preparing a hydrocarbon reforming catalyst, according to an embodiment.
Figure 3:
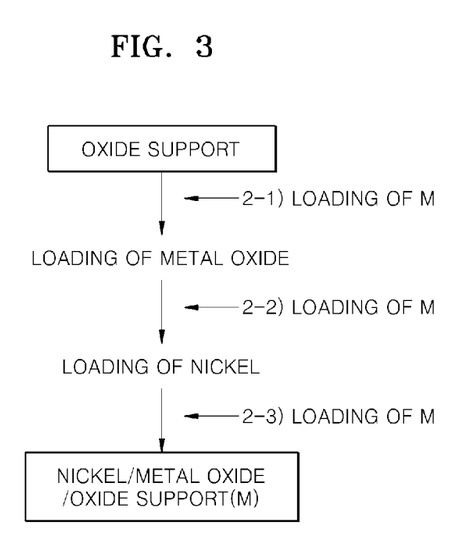
FIG. 3 is a diagram illustrating a method of preparing a hydrocarbon reforming catalyst, according to another embodiment.
Figure 4:
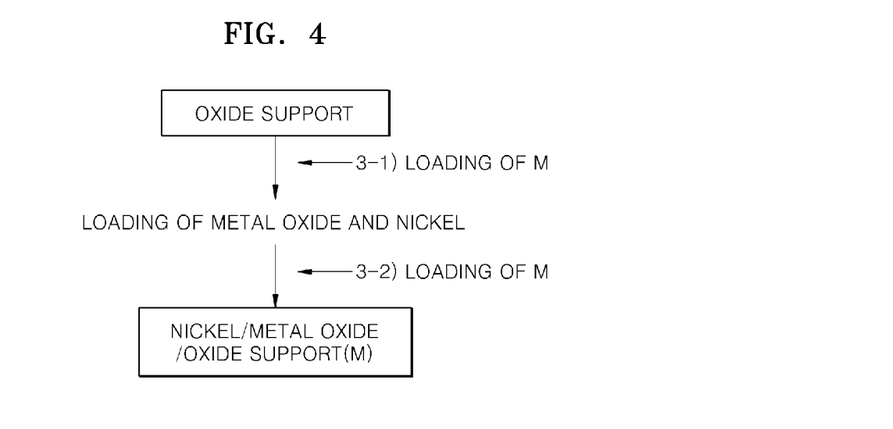
FIG. 4 is a diagram illustrating a method of preparing a hydrocarbon reforming catalyst, according to another embodiment.
Figure 5:
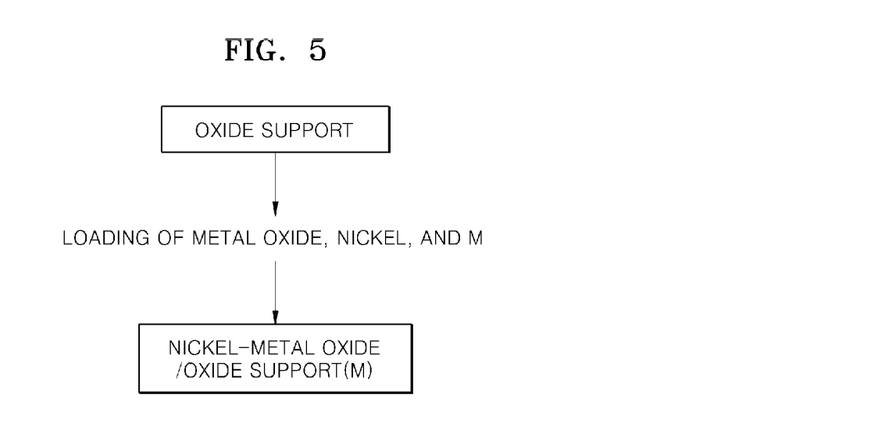
FIG. 5 is a diagram illustrating a method of preparing a hydrocarbon reforming catalyst, according to another embodiment.

Referring to FIGS. 2 through 5, M denotes an alkali metal or alkali earth metal. To prepare the hydrocarbon reforming catalyst, respective catalyst components, that is, nickel, a metal oxide, and an alkali metal or alkali metal, may be sequentially or simultaneously loaded onto an oxide support. The metal oxide can be loaded after the nickel is loaded as illustrated in FIG. 2, or before the nickel is loaded as illustrated in FIG. 3 or the metal oxide and the nickel can be simultaneously loaded as illustrated in FIGS. 4 and 5. As a specific, non-limiting example, the metal oxide may be loaded after the nickel is loaded as illustrated in FIG. 2. The alkali metal loading sequence is not limited, and the alkali metal may be loaded before the nickel is loaded, after the nickel is loaded and before the metal oxide is loaded or after the metal oxide is loaded as respectively illustrated in 1-1, 1-2 and 1-3 of FIG. 2.

Referring to FIG. 2, a method of preparing a hydrocarbon reforming catalyst according to an embodiment includes: loading nickel onto an oxide support and loading a metal oxide onto the resultant structure. The method may further include loading an alkali metal or alkali earth metal (M) at least one time selected from the group consisting of before the nickel is loaded (1-1), before the metal oxide is loaded (1-2), and after the metal oxide is loaded (1-3).

The respective catalyst components may be loaded onto the oxide support using various known methods, such as deposition precipitation, co-precipitation, wet impregnation, sputtering, gas-phase grafting, liquid-phase grafting, or incipient-wetness impregnation. For example, the respective catalyst components may be loaded onto the oxide support by incipient-wetness impregnation or wet impregnation. If a loading method that does not use a liquid as a medium is used, a drying process such as will be described later may be omitted.

For example, if nickel is loaded by wet impregnation, the following method can be used. A nickel precursor solution is added to an oxide support and the mixture is homogenously mixed. The oxide support may be selected from the group consisting of $Al_2O_3$, $SiO_2$, $ZrO_2$, $TiO_2$ and YSZ. The nickel precursor solution may be a solution in which a nickel salt is dissolved in a solvent selected from the group consisting of water; alcohol-based solvents such as methanol, ethanol, isopropyl alcohol, or butyl alcohol; and a mixture thereof. The mixing may be performed under any suitable conditions. For example, the mixing may be performed at a temperature in a range of about 40° C. to about 80° C. for about 1 hour to about 12 hours. The nickel salt may be selected from halides such as chlorides or fluorides, nitrates, sulfates, acetates and a mixture thereof.

Then, the mixed solution may be dried. For example, the drying process may be performed at a temperature in a range of about 100° C. to about 160° C. for about 3 to about 5 hours.

Then, the resultant dry product may be heat-treated. For example, the heat treatment process may be performed at a temperature in a range of about 500° C. to about 750° C. for about 2 to about 5 hours, thereby producing a heat treatment product in which nickel is loaded onto the oxide support. The heat treatment atmosphere may be an air atmosphere, but is not limited thereto.

The metal oxide may be loaded by wet-impregnation in the same manner as nickel is loaded. For example, when wet impregnation is used, a metal oxide precursor solution in which a metal salt is dissolved in a solvent selected from the group consisting of water; alcohol-based solvents such as methanol, ethanol, isopropyl alcohol, or butyl alcohol; and a mixture thereof is added to an oxide support and then the mixture is homogenously mixed. The metal salt may be selected from halides such as chlorides or fluorides, nitrates, sulfates, and acetates of at least one metal selected from the group consisting of manganese, magnesium, tin, cerium, molybdenum and tungsten.

Then, drying and heat-treating are performed under the same condition as in the nickel loading method, thereby producing a metal oxide/nickel/oxide support.

When the alkali metal or alkali earth metal is loaded by wet impregnation, a solution in which a metal precursor selected from the group consisting of halides of alkali metal or alkali earth metal, nitrates of alkali metal or alkali earth metal, sulfates of alkali metal or alkali earth metal, acetates of alkali metal or alkali earth metal, ammonium salt of alkali metal or alkali earth metal and a mixture thereof is dissolved in a solvent such as water, alcohol or a mixture thereof is added to an oxide support and then the mixture is homogenously mixed. Then, the resultant mixed solution is dried and heat-treated under the same condition as used for the metal oxide.

As a result, an alkali metal or alkali earth metal loaded onto the oxide support can be obtained.

By using the method illustrated in FIG. 2, a hydrocarbon reforming catalyst having a structure of metal oxide/nickel/oxide support (M) as illustrated in FIG. 1 can be obtained. In this case, the oxide support (M) indicates that alkali metal or alkali earth metal is distributed on the oxide support.

Referring to FIG. 3, a method of preparing a hydrocarbon reforming catalyst according to another embodiment includes loading a metal oxide onto an oxide support and loading nickel onto the resultant structure. The method may further include loading an alkali metal or alkali earth metal (M) at at least one time selected from the group consisting of before the metal oxide is loaded (2-1), before nickel is loaded (2-2), and after nickel is loaded (2-3).

The method illustrated in FIG. 3 is the same as the method illustrated in FIG. 2, except that the metal oxide is loaded first, and then nickel is loaded onto the oxide support. By using the method illustrated in FIG. 3, a hydrocarbon reforming catalyst having a structure of nickel/metal oxide/oxide support (M) can be obtained.

Referring to FIG. 4, a method of preparing a hydrocarbon reforming catalyst according to another embodiment includes simultaneously loading metal oxide and nickel onto an oxide support. The method may further include loading an alkali metal or alkali earth metal (M) before (3-1) or after (3-2) the metal oxide and nickel are simultaneously loaded. When the nickel and metal oxide are simultaneously loaded by, for example, wet impregnation, the oxide support is added to a mixture including the nickel precursor solution as described above and the metal oxide precursor solution as described above and then, the mixture is homogeneously mixed and dried.

Referring to FIG. 5, a method of preparing a hydrocarbon reforming catalyst according to another embodiment includes simultaneously loading a metal, nickel, and an alkali metal or alkali earth metal onto an oxide support. In this case, for example, if wet impregnation is used, a mixed solution including a nickel precursor, a metal oxide precursor and an alkali metal or alkali earth metal precursor can be used.

By using the methods illustrated in FIGS. 4 and 5, hydrocarbon reforming catalysts having a structure of metal oxide-nickel/oxide support (M) can be obtained.

Before being used in the SR reaction, the hydrocarbon reforming catalysts described above can be heat treated at a temperature in a range of about 600 to about 950° C. in a hydrogen atmosphere for about 1 to about 2 hours.

According to another embodiment, there is provided is a fuel process device including the hydrocarbon reforming catalyst according to the one or more embodiments as described above.

The fuel process device may include a reforming device including the hydrocarbon reforming catalyst. As a non-limiting example, the hydrocarbon reforming catalyst may be fixed to and filled in a tube-like reactor or a mixture flow reactor. However, the hydrocarbon reforming catalyst can also be applied in other ways.

Hereinafter, the structure and effect of the embodiments will be described more specifically with reference to examples and comparative examples. However, these examples are described only for illustrative purposes and are not intended to limit the scope of the invention.

<Preparation of Catalyst>

EXAMPLE 1

100 g of an $Al_2O_3$ support (manufacturer: Aldrich, particle size of 100 μm, and surface area of 150 $m^2g^{-1}$) was impregnated with 18.66 g of $KNO_3$ (manufacturer: Aldrich) as a potassium precursor so that the amount of K in the final hydrocarbon reforming catalyst was 6 weight %. The resultant mixture was dried at a temperature of 120° C. for 4 hours and then, sintered at a temperature of 700° C. for 2 hours in an air atmosphere, thereby producing a first sintered product.

Then, the first sintered product was impregnated with 30.4 g of $Ni(NO_3)_2 \cdot 6H_2O$ (manufacturer: Aldrich) as a nickel precursor so that the amount of Ni in the final hydrocarbon reforming catalyst was 5 weight %. The resultant mixture was dried at a temperature of 120° C. for 4 hours, and then sintered at a temperature of 700° C. for 2 hours in an air atmosphere, thereby producing a second sintered product.

Then, the second sintered product was impregnated with 46.77 g of $Mn(NO_3)_2 \cdot 6H_2O$ as a manganese precursor so that the weight ratio of Mn/Ni was 1:1. The resultant mixture was dried at a temperature of 120° C. for 4 hours, and then sintered at a temperature of 700° C. for 2 hours in an air atmosphere. As a result, a hydrocarbon reforming catalyst having a structure of $MnO_x/Ni/Al_2O_3$ (K) was obtained.

EXAMPLE 2

A hydrocarbon reforming catalyst having a structure of Ni—$MnO_x/Al_2O_3$ (K) was prepared in the same manner as in Example 1, except that $MnO_x$, Ni and K were simultaneously loaded by using a mixed solution including the nickel precursor, manganese precursor and potassium precursor that were used in Example 1.

COMPARATIVE EXAMPLE 1

Preparation of Hydrocarbon Reforming Catalyst

A hydrocarbon reforming catalyst having a structure of $Ni/Al_2O_3$ was prepared in the same manner as in Example 1, except that Mn and K were not impregnated. That is, the hydrocarbon reforming catalyst of Comparative Example 1 did not include Mn or K.

<Catalyst Performance Test>

EVALUATION EXAMPLE 1

Figure 6:
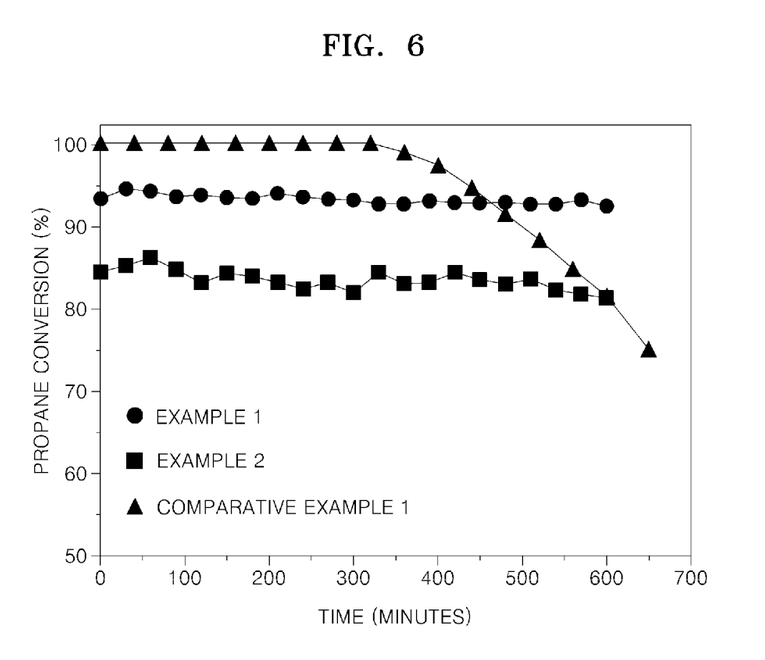
FIG. 6 is a graph showing conversion ratios of propane over time of hydrocarbon reforming catalysts manufactured according to Examples 1 and 2 and Comparative Example 1.

Conversion ratios of propane over time in the presence of the hydrocarbon reforming catalysts prepared according to Examples 1 and 2 and Comparative Example 1 were measured under the following driving conditions. The results are shown in FIG. 6.

Reaction temperature: 873 K
Space velocity (GHSV)=32,000 $h^{-1}$
gas composition: propane 95% and butane 5%
steam/C=3

EVALUATION EXAMPLE 2

Figure 7:
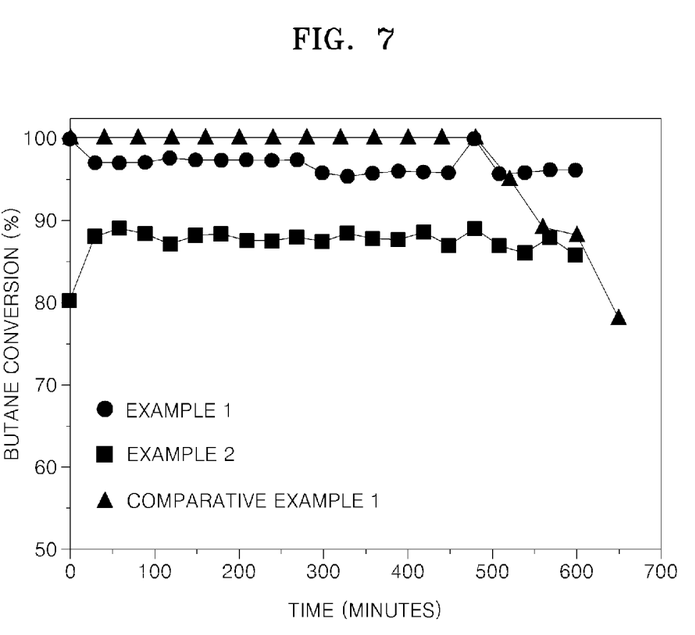
FIG. 7 is a graph showing conversion ratios of butane over time of hydrocarbon reforming catalysts manufactured according to Examples 1 and 2 and Comparative Example 1.

This evaluation experiment was performed in the same manner as in Evaluation Example 1, except that conversion ratios were measured with respect to butane instead of propane. Performance results of the hydrocarbon reforming catalysts prepared according to Examples 1 and 2 and Comparative Example 1 are shown in FIG. 7.

EVALUATION EXAMPLE 3

Figure 8:
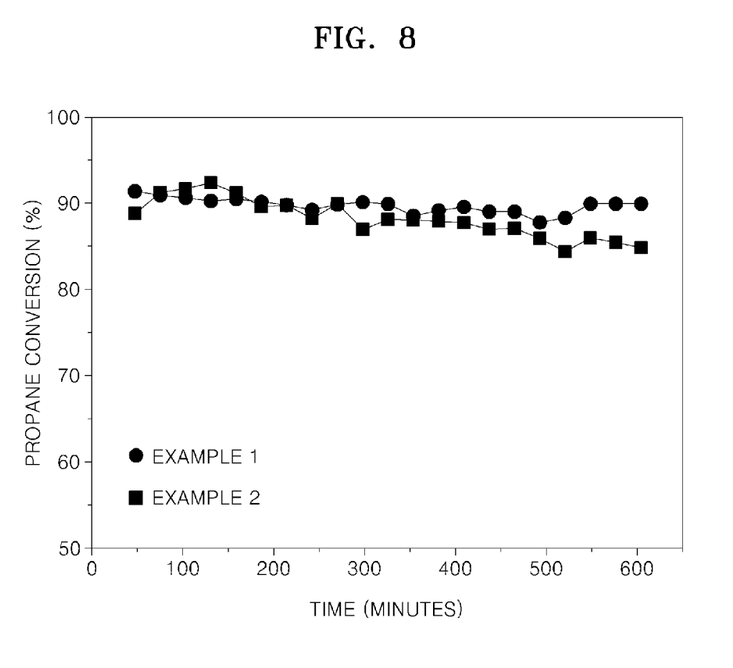
FIG. 8 is a graph showing conversion ratios of propane over time of hydrocarbon; reforming catalysts manufactured according to Examples 1 and 2.

Conversion ratios of propane over time in the presence of the hydrocarbon reforming catalysts prepared according to Examples 1 and 2 were measured under the following driving conditions. The results are shown in FIG. 8. For the hydrocarbon reforming catalyst prepared according to Comparative Example 1, when a SR reaction began, the propane conversion rate was less than 80%, but one to two hours later, pressure in a reactor was increased due to carbon deposition and thus the SR reaction stopped.

Reaction temperature: 973 K
Space velocity (GHSV)=60,900 h$^{-1}$
gas composition: propane 95% and butane 5%
steam/C=3

EVALUATION EXAMPLE 4

Figure 9:
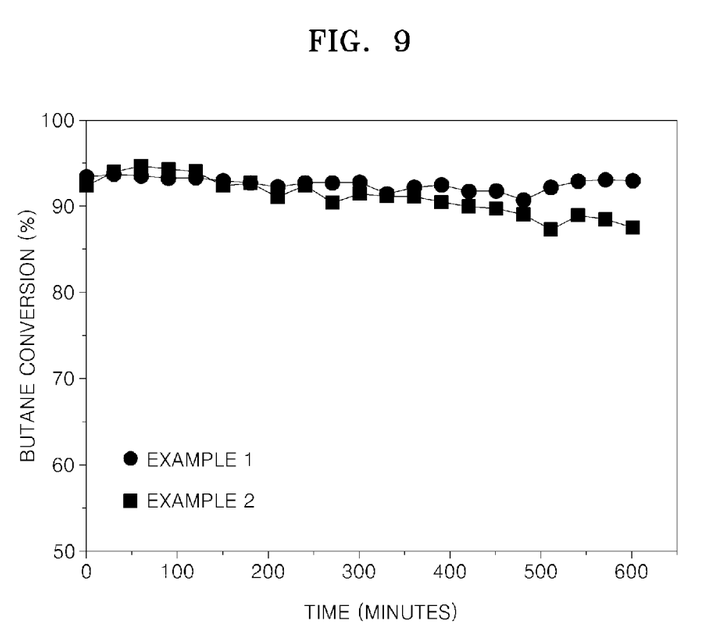
FIG. 9 is a graph showing conversion ratios of butane of hydrocarbon reforming catalysts manufactured according to Examples 1 and 2.

This evaluation experiment was performed in the same manner as in Evaluation Example 3, except that conversion ratios were measured with respect to butane instead of propane. Performance results of the hydrocarbon reforming catalysts prepared according to Examples 1 and 2 are shown in FIG. 9. Meanwhile, for the hydrocarbon reforming catalyst prepared according to Comparative Example 1, when a SR reaction began, the propane conversion rate was less than 80%, but one to two hours later, pressure in the reactor was increased due to carbon deposition and thus the SR reaction stopped.

EVALUATION EXAMPLE 5

A reactor was driven in the same condition as described in Evaluation Example 3 in the presence of the hydrocarbon reforming catalysts prepared according to Example 1 and Comparative Example 1 for 10 hours and then, the resultant catalysts were collected and carbon deposition rates were evaluated by thermogravimetric analysis (TGA). The carbon deposition rates were measured according to the following equation:

Carbon deposition rate=(heat loss weight)/
(weight of sample)×100

Results are shown in Table 1. According to Table 1, Example 1 showed a carbon deposition rate less than 10%, more specifically less than 5%.

TABLE 1

| | TGA (carbon deposition rate, %) |
|---|---|
| Example 1 | 4 |
| Comparative Example 1 | 64 |

Referring to FIGS. 6 through 9, it can be seen that the hydrocarbon reforming catalysts prepared according to Examples 1 and 2 have excellent reactivity even when used for a long driving time period. Also, referring to Table 1, the hydrocarbon reforming catalysts prepared according to Examples 1 and 2 have a lower carbon deposition rate than the hydrocarbon reforming catalyst prepared according to Comparative Example 1.

As described above, according to the one or more of the above embodiments, a hydrocarbon reforming catalyst having high coking resistance is provided.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A hydrocarbon reforming catalyst consisting of:
an oxide support; and
nickel, a metal oxide, and an alkali metal or alkali earth metal supported by the oxide support, the metal oxide being at least one oxide selected from manganese oxide, tin oxide, cerium oxide, rhenium oxide, molybdenum oxide, and tungsten oxide, and the alkali metal or alkali earth metal being at least one metal selected from lithium, sodium, potassium, magnesium, and calcium.

2. The hydrocarbon reforming catalyst of claim 1, wherein the oxide support includes at least one oxide selected from the group consisting of $Al_2O_3$, $SiO_2$, $ZrO_2$, $TiO_2$ and yttria-stabilized zirconia (YSZ).

3. The hydrocarbon reforming catalyst of claim 1, wherein the metal oxide is distributed on a layer including the nickel.

4. The hydrocarbon reforming catalyst of claim 1, wherein the metal oxide is distributed in a layer including the nickel.

5. The hydrocarbon reforming catalyst of claim 1, wherein the amount of nickel is in a range of about 1.0 to about 40 parts by weight based on 100 parts by weight of the hydrocarbon reforming catalyst.

6. The hydrocarbon reforming catalyst of claim 1, wherein the amount of metal in the metal oxide is in a range of about 0.5 to about 20 parts by weight based on 1 part by weight of nickel.

7. The hydrocarbon reforming catalyst of claim 1, wherein the amount of alkali metal or alkali earth metal is in a range of about 0.1 to about 20 parts by weight based on 100 parts by weight of the hydrocarbon reforming catalyst.

8. The hydrocarbon reforming catalyst of claim 1, wherein the metal oxide is manganese oxide and the hydrocarbon reforming catalyst includes the alkali metal, the alkali metal being potassium.

9. The hydrocarbon reforming catalyst of claim 1, wherein a carbon deposition rate of the hydrocarbon reforming catalyst is less than 10%.

10. The hydrocarbon reforming catalyst of claim 9, wherein the carbon deposition rate is less than 5%.

11. A fuel cell comprising the hydrocarbon reforming catalyst of claim 1.

12. A method of manufacturing a hydrocarbon reforming catalyst, the method comprising:
loading nickel onto an oxide support, thereby obtaining a first resultant structure;
loading a metal oxide onto the first resultant structure, the metal oxide being at least one oxide selected from manganese oxide, tin oxide, cerium oxide, rhenium oxide, molybdenum oxide, and tungsten oxide; and
loading alkali metal or alkali earth metal, the alkali metal or alkali earth metal being at least one metal selected from lithium, sodium, potassium, magnesium, and calcium,
wherein:
the alkali metal or alkali earth metal is loaded at least one time selected from before the nickel is loaded, after the nickel is loaded and before the metal oxide is loaded, and after the metal oxide is loaded, and
the hydrocarbon reforming catalyst formed thereby consists of the oxide support, and nickel, the metal oxide, and the alkali metal or alkali earth metal supported by the oxide support.

13. The method of claim 12, wherein the loading of the nickel, the loading of the metal oxide, and the loading of the alkali metal or alkali earth metal are each performed independently by deposition precipitation, co-precipitation, wet impregnation, sputtering, gas-phase grafting, liquid-phase grafting or incipient-wetness impregnation.

14. The method of claim 12, wherein each of the loading of the nickel, the loading of the metal oxide, and the loading of the alkali metal or alkali earth metal further comprises performing a heat-treatment process at a temperature in a range of about 500 to about 750° C. for about 2 to about 5 hours.

15. The method of claim 12, wherein the oxide support includes at least one oxide selected from the group consisting of $Al_2O_3$, $SiO_2$, $ZrO_2$, $TiO_2$ and YSZ.

16. A method of manufacturing a hydrocarbon reforming catalyst, the method comprising:
    loading a metal oxide onto an oxide support, the metal oxide being at least one oxide selected from manganese oxide, tin oxide, cerium oxide, rhenium oxide, molybdenum oxide, and tungsten oxide, thereby obtaining a first resultant structure;
    loading nickel onto the first resultant structure; and
    loading an alkali metal or alkali earth metal, the alkali metal or alkali earth metal comprises at least one metal selected from lithium, sodium, potassium, magnesium, and calcium,
    wherein:
        the alkali metal or alkali earth metal is loaded at at least one time selected from before the metal oxide is loaded, after the metal oxide is loaded and before the nickel is loaded, and after the nickel is loaded, and
        the hydrocarbon reforming catalyst formed thereby consists of the oxide support, and nickel, the metal oxide, and the alkali metal or alkali earth metal supported by the oxide support.

17. A method of manufacturing a hydrocarbon reforming catalyst, the method comprising:
    simultaneously loading a metal oxide and nickel onto an oxide support, the metal oxide being at least one oxide selected from manganese oxide, tin oxide, cerium oxide, rhenium oxide, molybdenum oxide and tungsten oxide; and
    loading a alkali metal or alkali earth metal, the alkali metal or alkali earth metal being at least one metal selected from lithium, sodium, potassium, magnesium, and calcium,
    wherein:
        the alkali metal or alkali earth metal is loaded before or after the metal oxide and nickel are simultaneously loaded, and
        the hydrocarbon reforming catalyst formed thereby consists of the oxide support, and nickel, the metal oxide, and the alkali metal or alkali earth metal supported by the oxide support.

18. A method of manufacturing a hydrocarbon reforming catalyst, the method comprising simultaneously loading nickel, a metal oxide, and an alkali metal or alkali earth metal onto an oxide support,
    the metal oxide being at least one oxide selected from manganese oxide, tin oxide, cerium oxide, rhenium oxide, molybdenum oxide, and tungsten oxide,
    the alkali metal or alkali earth metal being at least one metal selected from lithium, sodium, potassium, magnesium, and calcium, and
    the hydrocarbon reforming catalyst formed thereby consisting of the oxide support, and nickel, the metal oxide, and the alkali metal or alkali earth metal supported by the oxide support.

* * * * *